United States Patent [19]

Hämälä et al.

[11] 4,336,189

[45] Jun. 22, 1982

[54] PROCESS FOR RECOVERING LIGNOSULFONATES FROM SPENT SULFITE LIQUOR

[75] Inventors: Sirpa L. Hämälä, Tampere; Seppo T. Koivunen, Heinola; Anna-Kaisa Kontturi, Kerava; Veli J. Sarkkinen, Pori, all of Finland

[73] Assignee: Oy Tampella AB, Tampere, Finland

[21] Appl. No.: 153,947

[22] Filed: May 28, 1980

[30] Foreign Application Priority Data

May 28, 1979 [FI] Finland .................................. 791695

[51] Int. Cl.$^3$ .............................................. C07G 1/00
[52] U.S. Cl. ............................................... 260/124 R
[58] Field of Search .................................... 260/124 R

[56] References Cited

U.S. PATENT DOCUMENTS 3,251,820  5/1966  Grangaard ........................... 260/124
3,776,897  12/1973  Ikari et al. ........................... 260/124
3,825,526  7/1974  Forss et al. .......................... 260/124
4,111,928  9/1978  Holsopple et al. .................. 260/124

Primary Examiner—A. Siegel
Attorney, Agent, or Firm—Finnegan, Henderson, Farabow, Garrett & Dunner

[57] ABSTRACT

A process for recovering lignosulfonates from spent sulfite liquor resulting from the cooking of cellulose-containing material comprising extracting the spent liquor with a liquid amine dissolved in a strongly polar ketone, preferably methyl isobutyl ketone, as an organic solvent, which ketone is poorly soluble in water, to form a lignosulfonate-bearing organic phase and an aqueous phase, separating the organic phase from the aqueous phase, recovering the substantially sugar-free lignosulfonates from the organic phase by stripping the organic phase with a base insoluble in the organic phase, regenerating the stripped, lignosulfonate-free organic phase by treating it with an aqueous solution of sodium bisulfite to bring the liquid amine in the phase into bisulfite form and returning the regenerated organic phase for further extraction of spent liquor.

2 Claims, 1 Drawing Figure

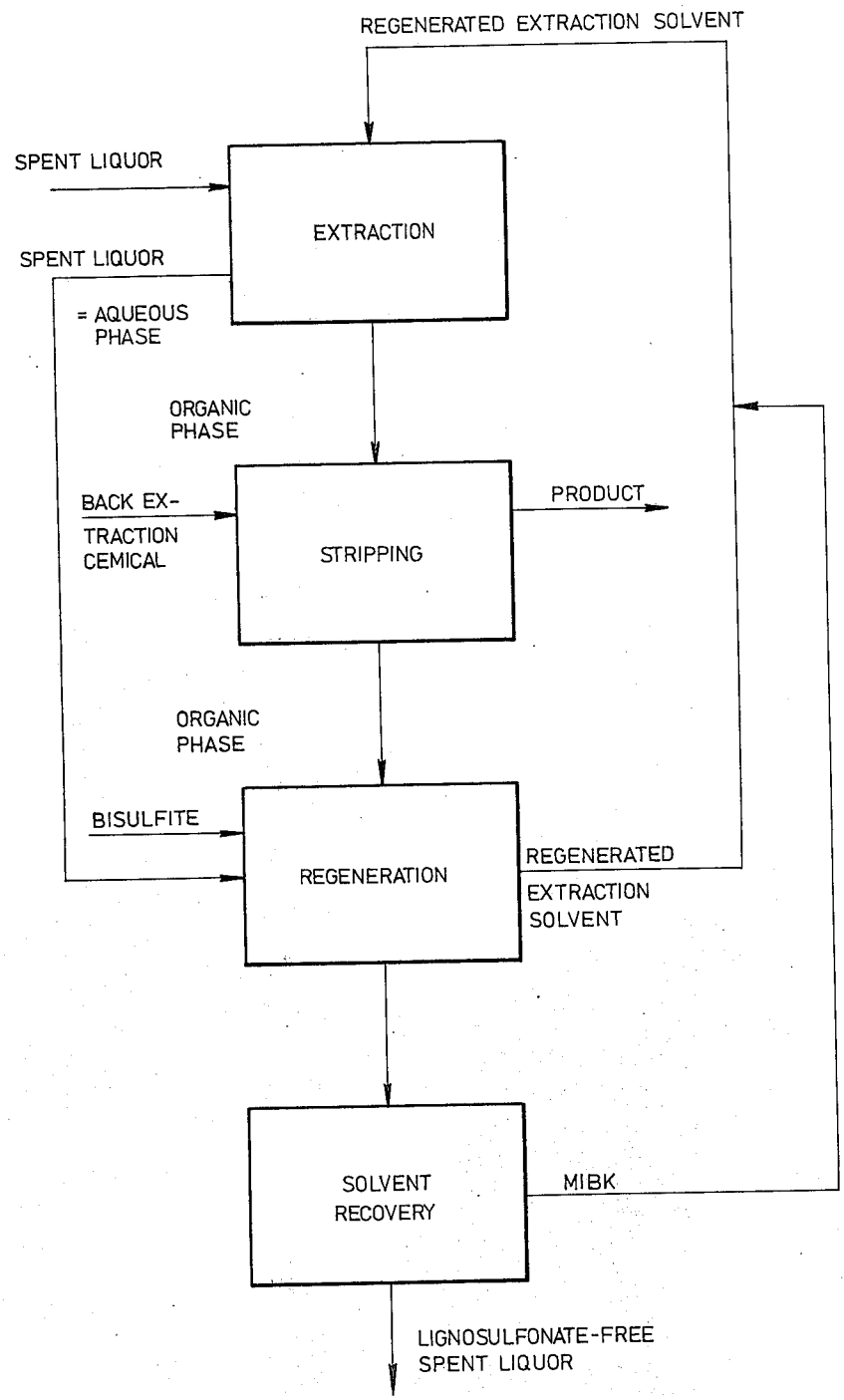

PROCESS FOR RECOVERING LIGNOSULFONATES FROM SPENT SULFITE LIQUOR

This invention relates to a process for separating lignosulfonic acids and lignosulfonates by extraction from spent sulfite liquor resulting from the cooking of cellulose-containing material, comprising, extracting spent liquor by means of liquid amine dissolved in an organic solvent poorly soluble in water;

separating the organic phase from the aqueous phase;

stripping the organic phase by means of a base; and returning the organic phase after regeneration to the extraction of spent liquor.

The U.S. Pat. Nos. 3,251,820 and 3,825,526 disclose methods for extracting lignosulfonic acids from spent liquor resulting from the cooking of a cellulose-containing material. According to these methods, the extraction is carried out by means of liquid amine practically insoluble in water and dissolved in an alcohol insoluble in water and containing 8 to 16 carbon atoms or in a lower alcohol partially soluble in water, such as butanol, whereby the alcohol dissolved in the water and the simultaneously dissolved amine can be recovered by means of a steam distillation.

In the first mentioned case the insolubility of the long chain alcohol does not fully guarantee that the alcohol remains as a phase of its own because the lignosulfonates easily emulgate it into the water, whereby a third phase is formed. In the second case a steam distillation process for recovering the alcohol dissolved in water and the amine simultaneously dissolved is necessary, which process is rather expensive as to its investment and energy costs.

In addition, the spent sulfite liquor according to these prior art processes have to be acidified before extraction in order to transfer the lignosulfonates into acid form, which, of course, adds to the cost of chemicals. When alcohol partially soluble in water, such as butanol, is used as solvent, the water phase dissolves partially in the organic phase and brings otherwise unextracted impurities, such as sugars, into the organic phase.

The object of this invention is to eliminate the above disadvantages and to create a process for separating the lignosulphonic acids and the lignosulphonates from spent sulfite liquor resulting from cooking of cellulose-containing material by extracting spent sulfite liquor by means of liquid amine dissolved in an organic solvent poorly dissoluble in water such that a separation of the phases is obtained, by separating the organic phase from the water phase, and by stripping the organic phase and returning it after regeneration to the extraction of spent sulfite liquor.

More precisely, the invention is characterized in that the organic solvent poorly dissoluble in water is a strongly polar ketone and the amine used as reagent is treated with an aqueous solution of sodium bisulfate in order to bring the liquid amine into bisulfite form.

When the extraction is carried out using a strongly polar ketone as organic solvent poorly dissoluble in water according to the present invention, the produced lignosulfate amine compound remains dissolved in the organic phase without any third phase being formed.

The solvent of liquid amine used in the process according to the invention is poorly soluble in water and, in addition, its evaporation from a salt-containing solution is very high, wherefore the solvent is easy to recover from the aqueous solution by means of methods known per se.

The process according to the invention makes it possible to extract also spent liquor containing lignosulfonates as such without the need for adding acid in order to increase the pH, as is the case in the prior art processes.

As extracting agent is hereby used a methyl isobutyl ketone solution of a liquid anion exchanger, such as a secondary amine, e.g., "Amberlite LA-1" or XLA-3 (manufacturer: Rohm & Haas), in which the liquid anion exchanger appears in the form of a salt, preferably a bisulfite or bicarbonate. Hereby the ability of the amine salt to exchange its anion for another anion contained in the water phase is employed. When using the alkaline form, the material to be extracted has to be in acid form, and the transport of the material to be extracted into the organic phase is carried out by means of a neutralizing process, whereby the soluble salt of the amine and the organic phase of the material to be extracted is formed.

Preferably, a methyl isobutyl ketone is used as strongly polar ketone. The liquid amine can be transported into bisulfite form by treating the ketone used as solvent with an aqueous solution of sodium bisulfite.

By blowing air or inert gas through the water phase resulting from the regeneration of the organic phase, the ketone dissolved in the aqueous phase can be stripped from the aqueous phase and recovered from the gaseous phase by some method known per se, such as active carbon absorption.

According to a preferred embodiment of the invention, the lignosulfonate is stripped from the separated organic phase resulting form the extraction of spent liquor by means of alkanol amine at an elevated temperature, whereby the lignosulfonate is recovered as alkanol amine lignosulfonate which is a useful dispersion material as such. The addition of alkanol amine is carried out preferably at the temperature 320° to 370° K. and as alkanol amine is preferably used diethanol amine, triethanol amine, N-methylethanol amine, N,N-dimethyl ethanol amine, N,N-diethyl ethanol amine, N-amino ethyl ethanol amine, or N-methyl diethanol amine, or a mixture thereof. Alkanol amine is added in amount of 20 to 200 percent, preferably 80 to 120 percent, by weight of the equivalent amount of the sulfonate groups of lignosulfonate.

The lignosulfonates extracted in the organic phase can also be removed by treating the separated organic phase resulting from the extraction with a base, such as ammonia or an aqueous solution thereof, or with an aqueous solution of sodium bisulfate or sodium bicarbonate.

The organic phase can be regenerated with some base or salt. Preferably, the regeneration is carried out in suitable balanced conditions by means of a sodium bisulfite solution or a sodium bicarbonate solution. Alternatively, the organic phase can be treated before or during extraction with sulphur dioxide or carbon dioxide water. The water phase separated in the extraction, i.e., the extracted spent liquor, can also be fed into a regeneration phase together with fresh bisulfite in order to regenerate the organic phase coming from the stripping before returning it to the extraction.

The invention will be described in more detail, reference being made to the enclosed drawing showing a flow chart of the process according to the invention.

The spent sulfite liquor containing lignosulfonates is under stirring brought into contact with a ketone solution of an amine in bisulfite form, whereby a ion exchange reaction takes place such that the bisulfite ion is exchanged for a lignosulfonate group according to the following equation.

$$R''R'NH_2HSO_{3(o)} + LSO_{3(aq)}^- = R'R''NH_2LSO_{3(o)} + HSO_{3(aq)}^- \quad (1)$$

The indices (o) and (aq) refer to the organic phase and the aqueous phase, respectively.

The dispersion formed after mixing is passed to a settling stage, where the organic phase and the aqueous phase are separated from each other. The mixing and the settling are called "extraction" in the enclosed drawing.

Those anions whose affinity to the anion exchanger in bisulfite form is smaller than that of the lignosulfonates, i.e., the kations and neutral organic compounds, such as sugars, remain in the settled aqueous phase.

The organic phase is liberated from the lignosulfonates either by bringing it into contact with an aqueous solution of some base or salt.

Preferably the back extraction can be carried out in suitable balanced conditions by means of an aqueous solution of sodium bisulfite. Thereby the following reactions take place:

$$R'R''NH_2 \cdot LSO_{3(o)} + OH^-_{(aq)} = R'R''NH_{(o)} + LSO_{3(aq)}^- + H_2O \quad (2)$$

or $$R'R''NH_2LSO_{3(o)} + HSO_{3(aq)}^- = R'R''NH_2HSO_{3(o)} + LSO_{3(aq)}^- \quad (3)$$

An aqueous solution of sodium hydroxide or gaseous ammonia can be used as base whereby, in the first mentioned case, an aqueous solution of sodium lignosulfonate and, in the second case, solid ammonium lignosulfonate is obtained. In the last mentioned case the following reaction takes place:

$$R'R''NH_2LSO_{3(o)} + NH_{3(g)} = R'R''NH_{(o)} + NH_4LSO_{3(s)} \quad (4)$$

The indices (g) and (s) refer here to the gaseous and solid states.

If the back extraction is carried out with a sodium bisulfite solution according to Equation (3), a high phase ratio has to be used between the organic and aqueous phase in order to recover the lignosulfonate in pure form.

The regeneration of the extraction solution is carried out either by means of aqueous solution of the exchange ion used in the extraction or by passing sulphur dioxide or carbon dioxide, depending on the exchange ion, directly into the extraction phase.

The recovery of the methyl isobutyl ketone (MIBK) dissolved in the aqueous phase of the extraction is carried out by stripping the ketone by means of blowing air or inert gas and recovering the ketone from the gas-ketone mixture so obtained by means of conventional technics, e.g., active carbon absorption.

In the following the invention will be described in more detail by means of examples:

EXAMPLE 1

Spent liquor was conducted at a flow rate of 100 m³/h into a mixing container and at the same rate, giving a phase ratio of 1:1, a solution containing bisulfite salt of the secondary amine "Amberlite LA-1", dissolved in methyl isobutyl ketone. In the mixing container were maintained a temperature of 60° C. and a sufficiently strong mixing for the material transfer between phases in order to obtain a sufficient degree of dispersion.

The analyses of the spent liquor were as follows:

| | |
|---|---|
| Lignosulfonic acid | 95 g/l |
| Ca | 9 g/l |
| Sugars | 6 g/l |
| pH | 5.5 |

The analyses of the organic solution were as follows:

| | |
|---|---|
| Methyl isobutyl ketone | 640 g/l |
| "Amberlite LA-1" | 160 g/l |
| $HSO_3^-$—S | 16.5 g/l |

From the mixing container the solvent dispersion was conducted into a settler where the phases were separated from each other. The analyses of the phases were now:

| | |
|---|---|
| Spent liquor | |
| Lignosulfonic acid | 1 g/l |
| Ca | — |
| Sugars | 6 g/l |
| Methyl isobutyl ketone | 15 g/l |
| "Amberlite LA-1" | 40 mg/l |
| $HSO_3^-$—S | 16.5 g/l |
| pH | 3.5 |
| The organic phase | |
| Methyl isobutyl ketone | 635 g/l |
| "Amberlite LA-1" | 160 g/l |
| Lignosulfonic acid | 94 g/l |
| Sugars | — |
| $HSO_3^-$—S | 1 g/l |

The $HSO_3^-$ sulphur of the spent liquor was partly in the form of $SO_2$, which immediately after the extraction disappeared into the gaseous phase and was conducted to the regeneration of "Amberlite LA-1". This $SO_2$ gas was formed in amount of 0.85 t/h calculated as sulphur. The MIBK dissolved in the spent liquor was removed by conducting air through the solution at the rate 5 m³/min and by collecting the MIBK from the gas mixture by means of active carbon. From the active carbon the MIBK was regenerated by means of steam and after dewatering it was returned into circulation. The spent liquor was returned into circulation after normal make-up additions. $NH_3$ gas was now fed into the organic phase. Hereby the $NH_4$-lignosulfonate precipitated as a course, easily filterable precipitate which was separated by filtration. The surplus amine was separated by washing, whereby a cake was obtained which, after pressure filtration, contained 10.8% MIBK, which was dried. From the drying vapors the MIBK (1.06 t/h) was recovered by cooling the exhaust air.

The organic phase from the lignosulfonic acid stripping was conducted into the regeneration of the "Amberlite LA-1". The regeneration was carried out by mixing "Amberlite LA-1" with water in which was dissolved $SO_2$. Additional sulphur had to be added in amount of 0.8 t/h. The organic phase was conducted back to the extraction phase.

EXAMPLE 2

The extraction was carried out as above but by using a MIBK solution of free amine instead of "Amberlite LA-1" and $HSO_3^-$ and feeding $CO_2$ gas into the extraction. The gas flow was 200 m³/h.

As the organic phase was fed into the extraction in the form of free amine, no regeneration phase was necessary. The MIBK stripping and the lignosulfonic acid stripping were carried out as in Example 1.

EXAMPLE 3

The process was performed as in Example 1 but the stripping was carried out by means of NaOH solution in amount of 50 g/l, the material ratio being 4:1. Hereby a Na/lignosulfonic acid solution was obtained, the concentration of which was 200 g/l.

EXAMPLE 4

The process was performed as in Example 1 but, instead of using methyl isobutyl ketone as diluent for the amine, diethyl ketone was used.

The analyses before extraction were as follows:

| | | | |
|---|---|---|---|
| Spent liquor: | | | |
| As in Example 1 | | | |
| The organic phase: | | | |
| Diethyl ketone | 640 g/l | | |
| "Amberlite LA-1" | 160 g/l | | |
| $HSO_3^-$—S | 16.5 g/l | | |
| The analyses after extraction were: | | | |
| Spent liquor: | | | |
| Lignosulfonic acid | 2.9 g/l | | |
| Ca | — | | |
| Sugars | 5.9 g/l | | |
| Diethyl ketone | 35 g/l | pH 3.6 | |
| "Amberlite LA-1" | 81 mg/ml | $HSO_3^-$—S | 16.5 g/l |
| The organic phase: | | | |
| Diethyl ketone | 620 g/l | | |
| Amberlite La-1 | 160 g/l | | |
| Lignosulfonic acids | 92.1 g/l | | |
| Sugars | 0.1 g/l | | |
| $HSO_3^-$—S | 1 g/l | | |

The diethyl ketone has caused a remarkable raise in the solvent losses of amine which is noticed also in economy.

EXAMPLE 5

An aqueous slurry having the concentration of 200 g/l was prepared out of iron oxide pigment. The slurry was divided into three equal portions into which was added TEA-lignosulfonate obtained in Example 1 in amounts of 0.0, 0.1, and 0.5%, respectively. After mixing, the dispersions were left as such and after 30 minutes their stability was examined. The results were as follows: At 0.0%, the pigment was totally flocculated, at 0.1%, the upper phase was strongly obscure, at 0.5%, the upper layer was not distinguishable and the pigment was entirely dispersed.

EXAMPLE 6

The process was performed as in Example 1 but using di-isobutyl ketone as diluent. The analyses of the spent liquor after extraction were as follows:

| | |
|---|---|
| Lignosulfonic acids | 80 g/l |
| Sugars | 6 g/l |
| Ca | 8 g/l |
| di-isobutyl ketone | <50 mg/l |
| "Amberlite LA-1" | 20 mg/l |
| pH | 4.9 |
| $HSO_3^-$—S | 3 g/l |

In this case the ion exchange result was unsatisfactory. The analysis of the organic phase was calculated as a difference.

| | |
|---|---|
| Di-isobutyl ketone | 640 g/l |
| "Amberlite LA 1" | 160 g/l |
| $HSO_3^-$—S | 13.5 g/l. |

In the foregoing examples the use of ketones having a high and a low solubility in water as dieluent has been presented. It can be said that the methyl isobutyl ketone represents an optimum as diluent.

What we claim is:

1. A process for recovering lignosulfonates from spent sulfite liquor resulting from the cooking of cellulose-containing material comprising:
    (a) extracting the spent liquor with a liquid amine dissolved in a strongly polar ketone as an organic solvent, which ketone is poorly soluble in water, to form a lignosulfonate-bearing organic phase and an aqueous phase;
    (b) separating the organic phase from the aqueous phase;
    (c) recovering the substantially sugar-free lignosulfonates from the organic phase by stripping the organic phase with a base insoluble in the organic phase;
    (d) regenerating the stripped, lignosulfonate-free organic phase by treating it with an aqueous solution of sodiumbisulfite to bring the liquid amine in the phase into bisulfite form; and
    (e) returning the regenerated organic phase for further extraction of spent liquor.

2. The process of claim 1, in which the ketone solvent is methyl isobutyl ketone.

* * * * *